US006879573B1

(12) United States Patent
Huo

(10) Patent No.: US 6,879,573 B1
(45) Date of Patent: Apr. 12, 2005

(54) CHANNEL SHARING BY DIVERSE MULTIFRAMES IN A WIRELESS COMMUNICATIONS NETWORK

(75) Inventor: David D. Huo, Andover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 764 days.

(21) Appl. No.: 09/663,355

(22) Filed: Sep. 15, 2000

(51) Int. Cl.$^7$ ............................................. H04B 7/212
(52) U.S. Cl. ....................................... 370/337; 370/347
(58) Field of Search ................................. 370/321, 336, 370/337, 345, 347, 370

(56) References Cited

U.S. PATENT DOCUMENTS

| | | | | |
|---|---|---|---|---|
| 5,648,967 A | * | 7/1997 | Schulz | 370/328 |
| 5,752,193 A | * | 5/1998 | Scholefield et al. | 455/452.2 |
| 5,806,003 A | * | 9/1998 | Jolma et al. | 455/522 |
| 5,854,784 A | * | 12/1998 | Solve et al. | 370/311 |
| 5,933,418 A | * | 8/1999 | Massingill et al. | 370/321 |
| 5,940,763 A | * | 8/1999 | Alperovich et al. | 455/450 |
| 5,974,315 A | * | 10/1999 | Hudson | 455/427 |
| 6,009,106 A | * | 12/1999 | Rustad et al. | 370/523 |
| 6,178,185 B1 | * | 1/2001 | Marks | 370/514 |
| 6,212,378 B1 | * | 4/2001 | Wismer | 455/429 |
| 6,438,115 B1 | * | 8/2002 | Mazur et al. | 370/347 |
| 6,497,599 B1 | * | 12/2002 | Johnson et al. | 370/330 |
| 6,539,010 B1 | * | 3/2003 | Hagerman et al. | 370/347 |
| 6,594,252 B1 | * | 7/2003 | Barany et al. | 370/347 |
| 6,597,681 B1 | * | 7/2003 | Conner | 370/347 |
| 6,647,000 B1 | * | 11/2003 | Persson et al. | 370/330 |

FOREIGN PATENT DOCUMENTS

WO 9914963 3/1999

OTHER PUBLICATIONS

"Concept Proposal for EGPRS–136", Meeting in Sophia Antipolis, France, Nov. 22–26, 1999.

(Continued)

*Primary Examiner*—Chau Nguyen
*Assistant Examiner*—Christine Ng

(57) ABSTRACT

A wireless communication system and method provide air interface channels using diverse multiframe types on a single frequency carrier. Physical channels for a single frequency carrier are defined as time slots, a series of consecutive time slots define a frame, and a plurality of multiframe types are defined for the single frequency carrier as including different numbers of consecutive frames. By multiplexing a plurality of multiframe types onto a single frequency carrier, diverse channels types such as traffic channels, broadcast control channels, and common control channels can be accommodated on the same frequency carrier to enable efficient utilization of frequency resources. In one exemplary implementation, a first multiframe type is defined as having x consecutive frames, a second multiframe type is defined as having y consecutive frames, and a third multiframe type is defined as having z consecutive frames. Thus, the frame number for the first multiframe type is counted modulus x, the frame number for the second multiframe type is counted modulus y, and the frame number for the third multiframe type is counted modulus z. The first, second, and third multiframe types are further assigned to different time slots. For example, if a frame is defined as having three time slots, the first multiframe type may be assigned to the first time slot, the second multiframe type may be assigned to the second time slot, and the third multiframe type may be assigned to the third time slot.

28 Claims, 4 Drawing Sheets

OTHER PUBLICATIONS

Mouly Michel et al., "The GSM System for Mobile Communications," GSM System for Mobile Communications. Comprehensive Overview of the European Digital Cellular Systems: Cell & Sys., pp. 215–216, 1992.

Glodal System For Mobile Communications, "Digital Cellular Telecommunications System (Phase 2+); Physical layer on the radio path; General Description", GSM 05.01 version 8.2.0 Release Dec. 1999, pp. 1–28.

Global System For Mobile Communications, Digital Cellular Telecommunications System (Phase 2+); Multiplexing and Multiple access on the radio path; GSM 05.02 version 8.4.0 Release 1999, pp. 1–79.

* cited by examiner

FIG. 1A

| TN1 | TN2 | TN0 | TN1 | TN2 | TN0 | TN1 | TN2 | TN0 | - - - - - - |

FIG. 1B

| TN0 | TN1 | TN2 |
|-----|-----|-----|
| TN0 | TN1 | TN2 |
| TN0 | TN1 | TN2 |
| TN0 | TN1 | TN2 |
| TN0 | TN1 | TN2 |
| TN0 | TN1 | TN2 |
| TN0 | TN1 | TN2 |
| TN0 | TN1 | TN2 |

| TN0 | TN1 | TN2 |
|---|---|---|
| Fn=0 | Fn=0 | Fn=0 |
| Fn=1 | Fn=1 | Fn=1 |
| Fn=2 | Fn=2 | Fn=0 |
| Fn=0 | Fn=3 | Fn=1 |
| Fn=1 | Fn=4 | Fn=0 |
| Fn=2 | Fn=0 | Fn=1 |
| Fn=0 | Fn=1 | Fn=0 |
| Fn=1 | Fn=2 | Fn=1 |
| Fn=2 | Fn=3 | Fn=0 |
| Fn=0 | Fn=4 | Fn=1 |
| Fn=1 | Fn=0 | Fn=0 |
| Fn=2 | Fn=1 | Fn=1 |
| Fn=0 | Fn=2 | Fn=0 |
| Fn=1 | Fn=3 | Fn=1 |
| Fn=2 | Fn=4 | Fn=0 |
| Fn=0 | Fn=0 | Fn=1 |
| Fn=1 | Fn=1 | Fn=0 |
| Fn=2 | Fn=2 | Fn=1 |
| .... 3 | ... 3 | ... 6 |

CHANNEL SHARING BY DIVERSE MULTIFRAMES IN A WIRELESS COMMUNICATIONS NETWORK

BACKGROUND OF THE INVENTION

1. Field of the Invention

The present invention relates to the field of wireless communications.

2. Description of Related Art

In wireless communications networks that use time division multiple access (TDMA), radio interface channels are defined as time slots on a given frequency. A particular channel uses the same repeating time slot, resulting in mutual orthogonality between different channels in time. The duration between when a given time slot repeats is called a frame, and multiple frames are typically organized into a larger logical structure called a multiframe. Multiframe size may vary depending on the type of information (i.e. "logical channel") the multiframe is designed to carry. As a rule, however, all time slots on a given frequency have the same type of frame and the same type of multiframe, such that only different frequencies may have different multiframe structures.

A wireless communications network that operates in accordance with the Global System for Mobile telecommunications (GSM) is an exemplary network in which different multiframe structures are provided on different frequencies. As is well known, a GSM network uses a combination of frequency division multiple access (FDMA), whereby available frequency spectrum is divided into separate frequency carriers, and TDMA, typically having eight time slots per frame, to share available frequency spectrum resources among all users. To schedule the timing of traffic and control transmissions ("bursts"), each group of eight time slots forms a frame, and frames are grouped together to form multiframes, such that the duration between repetitions of a given frame is one multiframe. Two basic types of multiframe structures are used in GSM, having 26 and 51 frames respectively. The 26 frame multiframe structure ("26 multiframe") primarily contains voice traffic channels and the 51 frame multiframe structure "51 multiframe") is used for control channels, including broadcast control channels that are used for base station identification and frequency allocations and common control channels that are used during call origination and call paging. The 26 multiframe uses different frequencies than the 51 multiframe. In this way, all time slots on a given frequency have the same type of frame/multiframe structure.

By using 26 frames per multiframe for traffic and 51 frames per multiframe for control, scheduling of traffic and control bursts is inherently de-synchronized because time slot 1 of frame 1 for both multiframe structures will only occur at the same time every 26x51 frames. This de-synchronization ensures that all mobile units have adequate opportunity to hear broadcast bursts being transmitted by network base stations and allows mobile units to make interference measurements for neighboring cells regardless of when the mobile unit is scheduled to transmit and receive traffic. GSM networks support packet data services, using a standard known as General Packet Radio Service (GPRS), by overlaying a packet-based air interface on the existing circuit switched GSM network, thereby giving the user an option to use a packet-based data service or circuit-switched voice service. The packet-based air interface of GPRS uses a 52 multiframe for traffic channels, i.e., a structure that is merely two consecutive 26 multiframes.

The U.S. wireless communications community has begun evolving the IS-136 TDMA standard toward a third-generation (3G) wireless network that supports high-speed packet data services such as Internet/intranet access and other multimedia applications. To provide such packet data services, the UWCC (Universal Wireless Communication Consortium) has chosen to adopt a variation of GSM GPRS technology, which is being called EDGE-COMPACT. Due to limits on the frequency spectrum available in the U.S. for launching packet data service, however, the $\frac{1}{9}$ or $\frac{1}{12}$ frequency reuse patterns (i.e., reuse patterns where the same frequency is used by every ninth or twelfth network cell or sector) that are used to avoid interference in the typical GSM network must be simulated in EDGE-COMPACT by accurately synchronizing base stations and "time-grouping" cells or sectors to reduce interference between control bursts from proximate base stations that are transmitting on the same frequency. More specifically, EDGE-COMPACT requires that each cell or sector be designated to one of three (or four) time-groups to protect control bursts, such that when a base station for a cell or sector assigned to a first time-group transmits control bursts base stations assigned to cells or sectors in other time-groups are idle. Thus, by appropriate synchronization of base stations, three (or four) mutually orthogonal physical carriers can be achieved for each frequency reuse is used only for control channels, while the traffic channels remain in a $\frac{1}{3}$ frequency reuse pattern (for three frequency carriers).

Unlike GPRS, EDGE-COMPACT does not have the underlying 51 multiframe of GSM that is used for control channels, and, due to the limited frequency spectrum available for implementation, has been designed to incorporate both broadcast control channels and common control channels within a single multiframe structure. For example, the 52 multiframe of EDGE-COMPACT schedules reserves frames in each multiframe for broadcast control channels such as a synchronization channel and a frequency correction channel. Since EDGE-COMPACT does not have the 51 multiframe structure of GSM, it does not support circuit-switched GSM service. Furthermore, because only a single 52 multiframe is used to schedule all transmissions in EDGE-COMPACT, it may be difficult for mobiles to measure interference power of neighboring cells, which is important for handover (for circuit-switched users) and cell-reselection (for packet-switched users), thereby negatively affecting overall network performance.

SUMMARY OF THE INVENTION

The present invention is a system and method for providing air interface channels in a wireless communications network. In accordance with the present invention, physical channels for a single frequency carrier are defined as time slots, a series of consecutive time slots define a frame, and a plurality of multiframe types are defined for the single frequency carrier as including different numbers of consecutive frames. By multiplexing a plurality of multiframe types onto a single frequency carrier, diverse channels type such as traffic channels, broadcast control channels, and common control channels can be accommodated on the same frequency carrier to enable efficient utilization of frequency resources.

In one exemplary implementation, a first multiframe type is defined as having x consecutive frames (e.g., x=3), a second multiframe type is defined as having y consecutive frames (e.g., y=5), and a third multiframe type is defined as having z consecutive frames (e.g., z=2). Thus, the frame number for the first multiframe type is counted modulus x, the frame number for the second multiframe type is counted modulus y, and the frame number for the third multiframe type is counted modulus z. The first multiframe type, the second multiframe type, and the third multiframe type are each associated with a different channel type. For example, the first multiframe type may be associated with broadcast control channels carrying information about the network and the cell/sectors the transmitting base station is serving, e.g. network ID, cell ID, power levels, available frequencies, supported services (voice, packet, location service), etc. The second multiframe type may be associated with common control channels, e.g., paging channels, access channels, resource allocation channels, etc., and the third multiframe type may be associated with defining traffic channels. In this implementation, the duration of a super frame is $x^*y^*z$ frames. When x, y, and z are mutual prime numbers, the frame number $0$ of the multiframe types having x, y, and z frames, respectively, will re-occur simultaneously every super frame. The number of frames corresponding to each multiframe type is preferably chosen so that the different multiframes are inherently de-synchronized. In this way, mobile units are ensured opportunities to hear broadcast channel bursts from network base stations, as well as make measurements on channels of neighboring cells, regardless of the timing at which the mobile units are scheduled to receive/transmit traffic bursts.

In accordance with an embodiment of the present invention, the first, second, and third multiframe types are assigned to different time slots. For example, if a frame is defined as having three time slots, the first multiframe type may be assigned to the first time slot, the second multiframe type may be assigned to the second time slot, and the third multiframe type may be assigned to the third time slot.

According to a specific implementation of the diverse multiframe principles of the present invention, a first multiframe type is defined as having 51 frames for scheduling broadcast control channels in an environment in which cells/sectors are "time-grouped" to provide greater frequency reuse (i.e., in a EDGE-COMPACT-type environment). On the same frequency carrier as the 51 multiframe for broadcast control channels, a second multiframe type is defined as having 52 frames for scheduling common control channels. For each time-group, the 51 multiframe and the 52 multiframe that share the same frequency carrier are assigned to different time slots to avoid interference between broadcast and common control bursts. As compared with current EDGE-COMPACT proposals, this diverse multiframe arrangement provides a control arrangement that is more consistent with GSM and may, thus, facilitate achieving a GSM-compatible packet data service network with limited frequency spectrum.

BRIEF DESCRIPTION OF THE DRAWINGS

Other aspects and advantages of the present invention will become apparent upon reading the following detailed description and upon reference to the drawings, in which:

FIG. 1A shows an exemplary one-dimensional representation of the division of a single frequency carrier into a plurality of time slots used to illustrate general principles underlying the present invention;

FIG. 1B shows an exemplary two-dimensional representation of a division of a single frequency carrier into a plurality of time slots that repeat each frame used to illustrate general principles underlying the present invention;

FIG. 2 shows an exemplary diverse multiframe structure in which three multiframes types are associated with different numbers of frames and are each assigned to a particular time slot;

DETAILED DESCRIPTION

Figure 3:
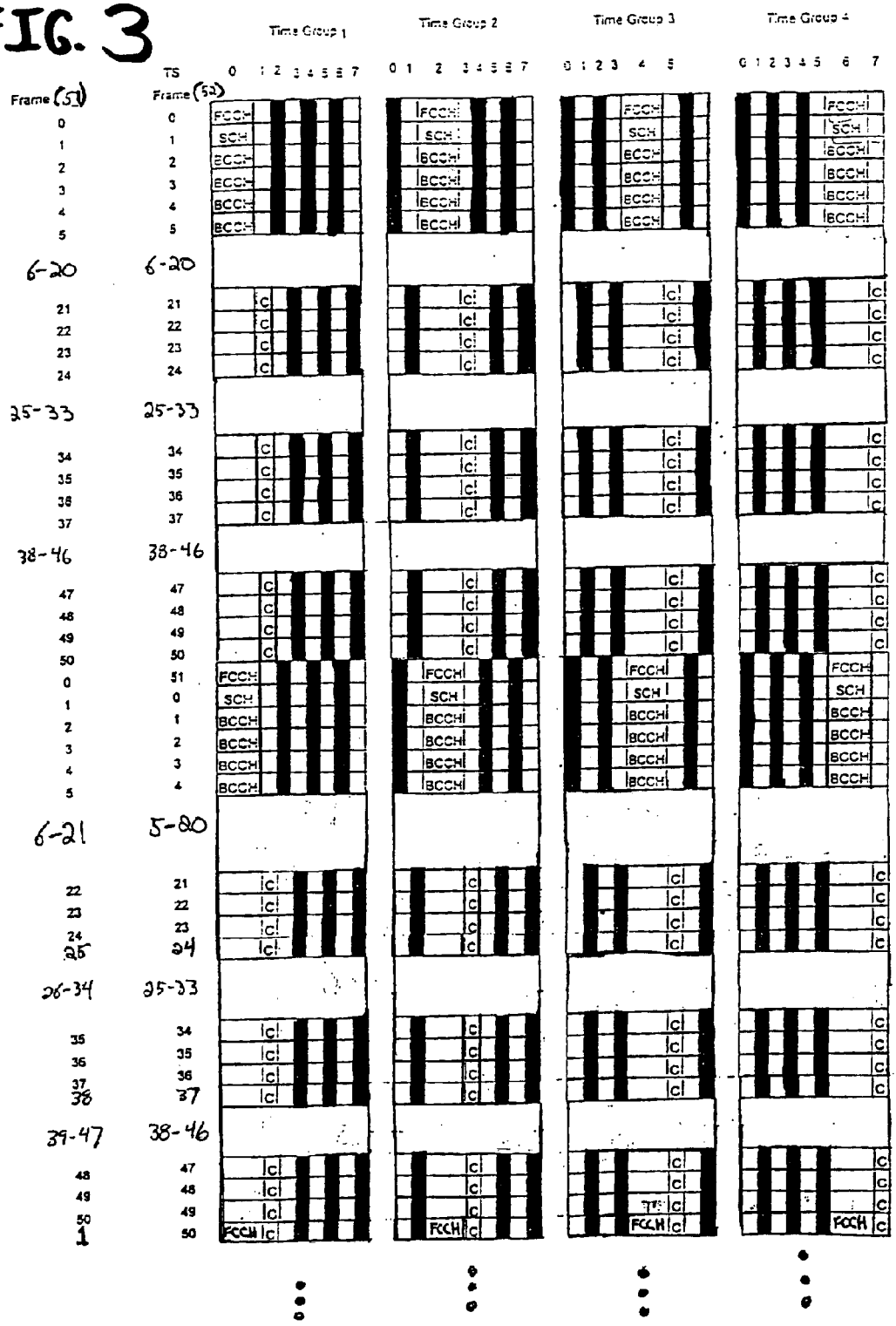
FIG. 3 shows an exemplary implementation of principles of the present invention in which a 51 frame multiframe structure for broadcast control channels is multiplexed on the same frequency carrier with a 52 frame multiframe structure for common control channels.

The present invention is a system and method for providing air interface channels in a wireless communications network. In accordance with the present invention, physical channels for a single frequency carrier are defined as time slots, a series of consecutive time slots define a frame, and a plurality of multiframe types are defined for the single frequency carrier as including different numbers of consecutive frames. By multiplexing a plurality of multiframe types onto a single frequency carrier, diverse channels types, such as traffic channels, broadcast control channels, and common control channels, are accommodated on the same frequency carrier to enable efficient utilization of frequency resources. The general principles of the present invention will be described below with reference to FIGS. 1A, 1B, and 2, and an exemplary implementation of the present invention will be described with reference to FIG. 3.

FIG. 1A illustrates a one-dimensional representation of an exemplary division of a single frequency carrier into a plurality of time slots. In the example shown in FIG. 1A, three time slots, TN0, TN1, and TN2, are provided in one frame, such that each time slot TN0, TN1, and TN2 repeats every three time slots. It should be realized that although three time slots are shown in FIG. 1A, this number is merely used for ease of describing the principles of the present invention and a larger number of time slots will typically be used for actual implementation in a wireless communications network. For example, the present invention may be implemented in a wireless network in which a carrier frequency is divided into eight time slots, as in GSM.

FIG. 1B shows a representation of repeating time slots in two-dimensions, where each column corresponds to a different time slot number and a sequence of consecutive frames extends along the second dimension as a number of rows. This two-dimensional representation is typically used to illustrate a multiframe structure having a sequence of consecutive frames. In accordance with the present invention, diverse multiframe structures are multiplexed onto a single frequency carrier, each multiframe structure consisting of a different number of frames. As an illustrative example, a first type of multiframe (hereinafter "the type 1 multiframe") has 3 consecutive frames, a second type of multiframe (hereinafter "the type 2 multiframe") has five consecutive frames, and a third type of multiframe (hereinafter "the type 3 multiframe") has two consecutive frames. Therefore, the frame number for the type 1 multiframe is counted modulus 3, the frame number for the type 2 multiframe is counted modulus 5, and the frame number for the type 3 multiframe is counted modulus 2. Given their different structures, the type 1, type 2, and type 3 multiframe structures are assigned to different channel types (i.e., different logical channels). For example, the type 1 multiframe structure may be associated with defining channels for broadcasting relevant network and cell access information, such as synchronization and frequency correction information, the type 2 multiframe structure may be associated with defining traffic channels to control the timing of voice/data traffic bursts from network base stations and mobile units, and the type 3 multiframe structure may be associated with channels for common control, such as paging, access, and other services. Each multiframe type is assigned to a different time slot so as to be multiplexed on the same frequency carrier. For the above-described example, the type 1 multiframe is assigned to TN0, the type 2 multiframe is assigned to TN1, and the type 3 multiframe is assigned to TN2.

FIG. 2 illustrates a two-dimensional representation of diverse multiframes in which each of three multiframe types, having 3, 5, and 2 frames and being assigned to TN0, TN1, and TN2 respectively, are shown. As seen in FIG. 2, the frame number for the type 1 multiframe, associated with TN0, repeats every 3 frames (i.e., the frame number is counted modulus 3), the frame number of the type 2 multiframe, associated with TN1, repeats every 5 frames (i.e., the frame number is counted modulus 5), and the frame number of the type 3 multiframe, associated with TN2, repeats every 2 frames (i.e., the frame number is counted modulus 2). In this example, the duration of a super frame, i.e., the fewest number of frames between which the same frame number re-occurs simultaneously for the type 1 multiframe, the type 2 multiframe, and type 3 multiframe, is $3*5*2=30$. Advantageously, the number of frames corresponding to different multiframe structures can be set to provide de-synchronization between broadcast control channels, common control channels, and traffic channels so that each mobile unit is provided with adequate opportunities to hear broadcasts from neighboring cells and make interference measurements, regardless of the time slot at which the mobile is assigned to transmit/receive traffic bursts.

Furthermore, if a particular time slot is not fully loaded, then part of the resource associated with that time slot can be used for another purpose, such that more than one multiframe type can be associated with a single time slot. For example, if we assume that the type 1 multiframe is used for broadcast control channels, the type 2 multiframe is used for traffic, and the type 3 multiframe is used for common control channels and time slot TN0 (assigned to the type 1 multiframe) is discontinuous, i.e., not all frames per multiframe are being used, then time slot T0 can also be used for traffic when it is not being used for broadcast control. Thus, time slot T0 may be used in two types of multiframes in this example, such that the time slot is counted as type 1 during broadcast control and is counted as type 2 when used for traffic.

an exemplary implementation of the diverse multiframe principles of the present invention in a network arrangement in which cell/sectors are "time-grouped" to increase frequency reuse (e.g., an EDGE-COMPACT-type network) will next be described with reference to FIG. 3. As described previously, EDGE-COMPACT has been designed to incorporate both broadcast and common control channels into a 52 multiframe structure because the 51 multiframe structure of GSM that is used for control channels is not available. In the implementation illustrated in FIG. 3, a 51 multiframe structure for certain broadcast control channels, BCCH (Broadcast Control CHannel), FCCH (Frequency Control CHannel), and SCH (Synchronization CHannel), shares a frequency carrier with a 52 frame multiframe structure for certain packet control bursts, PCCCH (Packet Common Control CHannel). It should be recognized that, although these broadcast control channels are illustrated in FIG. 3 and described herein as BCCH, FCCH, and SCH, packet versions of these broadcast channels are actually used in an EDGE-COMPACT-type network (i.e., these broadcast control channels are actually PBCCH, PFCCH, and PSCH, respectively). In addition to the 51 multiframe for broadcast control channels, a 52 multiframe structure is provided for common control channels on the same frequency carrier. Such common channels are merely designated as "C" in FIG. 3, and occur in a different time slot relative to the broadcast control channels so that the broadcast control channel bursts and the common control channel bursts do not interfere with each other.

As described above, cells/sectors in an EDGE-COMPACT-type network are "time-grouped" and the base stations are time-synchronized to prevent interference between the control "bursts" of neighboring base stations and, thus, achieve greater frequency reuse. FIG. 3 illustrates a multiframe structure for cells/sectors in a first time-group, "Time Group 1," a second time-group, "Time Group 2," a third time-group, "Time Group 3," and a fourth time-group, "Time Group 4." In Time Group 1, it can be seen that the first time slot ("TS 0") is assigned to the 51 multiframe for broadcast control channels and the second time slot ("TS 1") is assigned to the 52 multiframe for common control channels. Thus, base stations for cells/sectors in Time Group 1 transmit common control bursts during TS 1 of certain frames (frames 21–24, 34–37, and 47–50 of a 52 multiframe for the example shown in FIG. 3) and transmit broadcast control bursts, FCCH, SCH, and BCCH, during TS 0 of certain frames (frames 0–5 of a 51 multiframe structure for the example shown in FIG. 3). To avoid interference with these broadcast control and common control bursts from base stations of Time Group 1 cells/sectors, base stations for cells/sectors in Time Group 2, Time Group 3, and Time Group 4 in the example shown in FIG. 3 are idle during TS 1 of frames 21–24, 34–37, and 47–50 (of a 52 multiframe structure) and during TS 0 of frames 0–5 (of a 51 multiframe structure). Similarly, base stations for cells/sectors in Time Group 1 are idle during TS 3, TS 5, and TS 7 of frames 21–27, 34–37 and 47–50 (of a 52 multiframe structure) and TS 2, TS 4, and TS 6 of frames 0–5 (of a 51 multiframe structure) to avoid interfering with the control bursts of base stations for cell/sectors in other time-groups. The darkened time-slots in FIG. 3 illustrate the restricted time slots for each time-group.

As seen in FIG. 3, the 51 multiframe is assigned to TS 2, TS 4, and TS 6 for Time Groups 2, 3, and 4, respectively, and the 52 multiframe is assigned to TS 3, TS 5, and TS 7 for Time Groups 2, 3, and 4, respectively.

The frame numbers for each of the 51 multiframe and the 52 multiframe are shown along the left side of FIG. 3 under the heading "Frame (51)" and "Frame (52)," respectively. As shown by these frame numbers, the Frame (51) will slide relative to the Frame (52) number by 1 each multiframe.

Because the Frame 51 number is counted modulus 51 and the Frame 52 number is counted modulus 52, frame numbers for two different multiframe structures must be determined at the mobile unit to enable communication. According to an aspect of the present invention, the frame number of the 52 multiframe may be determined using a mapping function that calculates the 52 multiframe frame number from parameters of the 51 multiframe.

It is well known that mobile units in a GSM network determine the absolute frame number (i.e., the multiframe location in the super frame and the frame location in the 51 multiframe) from frame parameters (T1, T2, T3') transmitted by each base station as part of the synchronization control channel. More specifically, each mobile unit determines frame number, FN, by calculating $$FN=T1^*51^*26+51^*((T3-T2) \bmod 26)+T3, \quad (1)$$

where

T3=T3'10+1;

T1=FN div (51*26);

T2=FN mod 26; and

T3=FN mod 51.

According to principles of the present invention, the mobile unit must monitor the frame number in different multiframes. Thus, for the exemplary implementation shown in FIG. 3 where a 51 multiframe for broadcast control channels and a 52 multiframe for common control channels are multiplexed on a single frequency carrier, the mobile units determine the absolute frame number in the 51 multiframe and the absolute frame number in the 52 multiframe. In one implementation of the present invention, the mobile units use 51 multiframe frame parameters (T1, T2, T3) transmitted by the base station as part of the synchronization channel to calculate corresponding frame parameters (U1, U2, U3) of the coincident 52 multiframe to determine the frame location relative to the 52 multiframe. More specifically, the frame number for the 52 multiframe, FN (52), may be represented as:

$$FN(52)=U1^*51^*52+52^*((U2-U3) \bmod 51)+U3, \quad (2)$$

where

U1=[T1/2];

U2=T4'mod 51;

U3=T4'mod 52; and

T4'=51*((T3-T2)mod 26)+T3+1326*K (T1 mod 2, 1), with K (x, y)=1 for x=y and K (x,y)=0 otherwise.

By mapping 51 multiframe frame parameters to 52 multiframe frame parameters, the mobile unit is able to determine the frame number for diverse multiframes based on a single set of frame parameters transmitted from the base station and a mapping function stored in memory. Furthermore, the system can use a single frame counter and the above-described mapping function to address the same frame in different multiframe structures.

Another issue arising from multiplexing diverse multiframes on a single frequency carrier in an EDGE-COMPACT-type network described above concerns the reservation of the entire frame 25 (counted in the 52 multiframe) for a Packet Time Advance CHannel ("PTCH") for controlling mobile unit transmission timing to compensate for delay. In other words, frame 25 of the 52 multiframe is reserved so that all base stations transmit PTCH and cannot be used for another purpose. Therefore, the 51 multiframe should observe frame number 25 of the 52 multiframe so that broadcast control information is not scheduled for the coincident frame of the 51 multiframe. Because the frame number of the 51 multiframe slides relative to the 52 multiframe, a conflict will occur with respect to the PTCH unless otherwise addressed. As one way to address this problem, the frame location of the first occurring broadcast control channel (shown as "FCCH" in FIG. 3) may periodically be rescheduled (i.e., jump ahead) when a conflict between a broadcast control channel and frame 25 of the 52 multiframe is about to occur. For example, the schedule in the following table shows the frame number where FCCH may occur in the 51 multiframe to ensure that there is no conflict with PTCH:

TABLE 1

Broadcast Control Channel Scheduling

| I | 0 | 1 | 2 | 3 | 4 | 5 | 6 | 7 | 8 | 9 | 10 | 11 | 12 |
|---|---|---|---|---|---|---|---|---|---|---|----|----|----|
| FN_FCCH(I) | 30 | 20 | 10 | 0 | 40 | 30 | 20 | 40 | 30 | 20 | 10 | 0 | 40 |

In Table 1, FN_FCCH(I) is the frame number within the 51 multiframe assigned to FCCH for a given I, and I=(FN div (51*16)) mod 13. Thus, I is an index of blocks of 16 51-multiframes within each period of 13 such blocks, and thus indicates that a new FCCH assignment is given for each $16^{th}$ 51-multiframe (i.e., the periodic rescheduling of broadcast control channels occurs each $16^{th}$ 51-multiframe). In this way, the 51-multiframe and the 52-multiframe can be multiplexed on the same frequency carrier without conflict between the broadcast control channels and reserved frames of the 52-multiframe.

Figure 4:
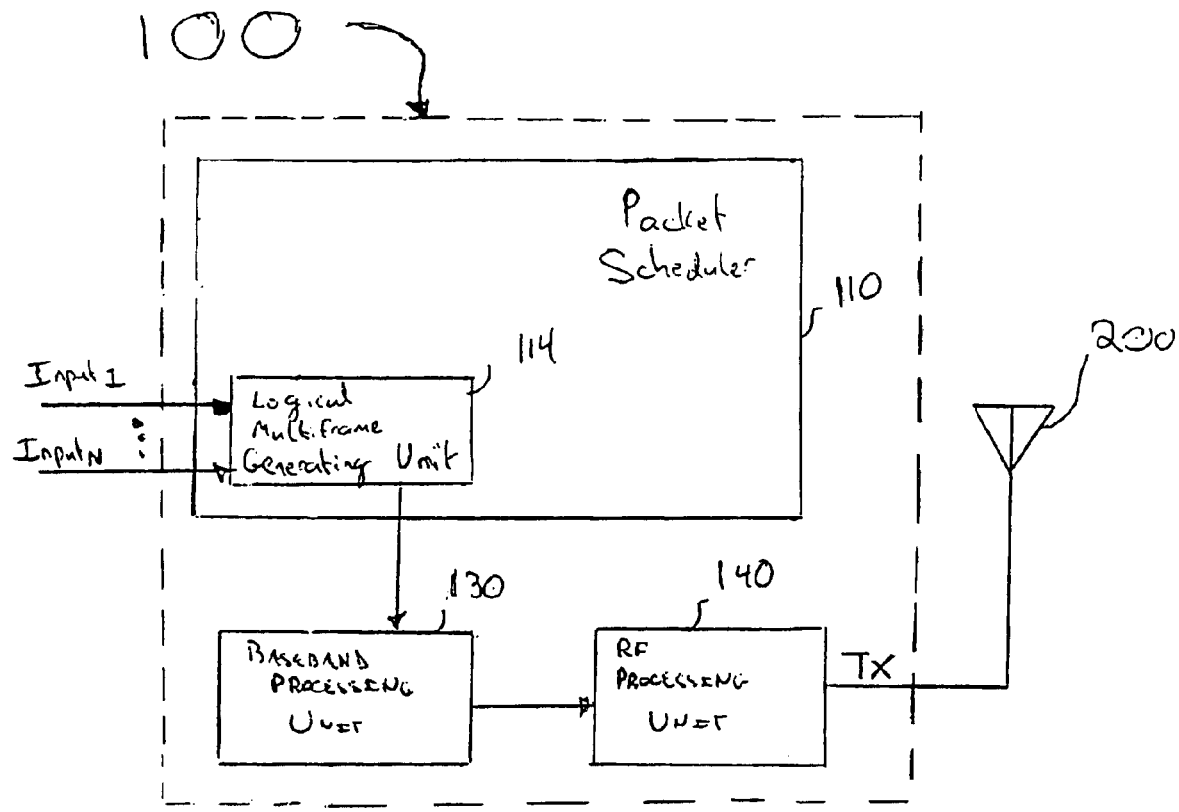
FIG. 4 is a general block diagram of an exemplary base station transmitter suitable for implementing diverse multiframe channel sharing according to an embodiment of the present invention.

FIG. 4 is a general block diagram of an exemplary bas station transmitter suitable for implementing diverse multiframe channel sharing in accordance with an embodiment of the present invention. As shown in FIG. 4, the transmitter 100 includes a packet scheduler unit 110, a baseband processing unit 130, and a radio frequency (RF) processing unit 140. The packet scheduler 110 includes a logical multiframe generating unit 112 which receives a plurality of signals input$_1$, . . . , input$_N$, including for example voice/data traffic to be transmitted to mobile units being served by the base station as well as broadcast and common control information. In accordance with the diverse multiframe structures of the present invention, the traffic/control scheduler 114 maps traffic, broadcast, and common control information to time slot/frame locations.

The baseband processing unit 130 receives the output of the packet scheduler 110 and maps the logical multiframe packets onto physical timeslots/frames. The RF processing unit 140 receives the output of the baseband processing unit 130 that generates an RF transmission signal, Tx, using an assigned RF channel, which is output to a transmitter antenna 200.

It should be apparent to those skilled in the art that various modifications and applications of the present invention are contemplated which may be realized without departing from the spirit and scope of the present invention.

What is claimed is:

1. A communication method, comprising:

transmitting a first information on a single frequency carrier in accordance with a first multiframe structure having x frames, x being an integer;

transmitting a second information on said same single frequency carrier in accordance with a second multiframe structure having y frames, y being an integer different than x;

arranging said first and second multiframe structures in time groups, each of said time groups having a plurality of timeslots; and allocating a plurality of timeslots in each of said time groups to said first information and to said second information so that said first information and said second information are transmitted in time slots that are different from each other within each time group, and so that said first and second information are transmitted in different timeslots in each of said time groups.

2. The method of claim 1, wherein said first information includes broadcast control information.

3. The method of claim 1, wherein said first information includes common control information.

4. The method of claim 1, wherein said first information includes broadcast control information and said second information includes common control information.

5. The method of claim 1, wherein said first multiframe structure has 51 frames.

6. The method of claim 1, wherein said first multiframe structure has 52 frames.

7. The method of claim 5, wherein
said second multiframe structure has 52 frames,
said first information included broadcast control information, and
said second information includes common control information.

8. The method of claim 1, wherein a base station of a wireless communication network performs said step of transmitting a first information and said step of transmitting a second information.

9. The method of claim 1, wherein said allocating step prevents said step of transmitting said first information from interfering with said step of transmitting said second information within a same time group, and prevents transmission of any one of said first information and said second information in one time group from interfering with transmission of any one of said first information and said second information in each of the other time groups.

10. The method of claim 1, wherein said first and second multiframe structures are time-grouped according to an edge-compact type network.

11. A communication method, comprising:
transmitting a first information on a single frequency carrier in accordance with a first multiframe structure having x frames, x being an integer;
transmitting a second information on said same single frequency carrier in accordance with a second multiframe structure having y frames, y being an integer different than x;
transmitting a third information on said same single frequency carrier in accordance with a third multiframe structure having z frames, z being an integer different than x and y;
arranging said first, second and third multiframe structures in time groups, each of said time groups having a plurality of timeslots; and
allocating a plurality of timeslots in each of said time groups to said first information, said second information and said third information so that said first, second and third informations are transmitted in time slots different from each other within each time group.

12. A communication method, comprising:
transmitting a first information on a single frequency carrier in accordance with a first multiframe structure having x frames, x being an integer;
transmitting a second information on said same single frequency carrier in accordance with a second multiframe structure having y frames, y being an integer different than x, wherein a current frame number for said second multiframe structure is derived from parameters that represent a current frame number for said first multiframe structure;
arranging said first and second multiframe structures in time groups, each of said time groups having a plurality of timeslots; and
allocating a plurality of timeslots in each of said time groups to said first information and to said second information so that said first information and said second information are transmitted in time slots that are different from each other within each time group.

13. A communication system, comprising:
means for transmitting a first information on a single frequency carrier in accordance with a first multiframe structure having x frames, x being an integer;
means for transmitting a second information on said same single frequency carrier in accordance with a second multiframe structure having y frames, y being an integer different than x;
arranging means for arranging said first and second multiframe structures in time groups, each of said time groups having a plurality of timeslots; and
allocating means for allocating a plurality of said timeslots to said first information and for allocating a plurality of said timeslots to said second information, so that said first information and said second information are transmitted in time slots that are different from each other within each time group, and so that said first and second information are transmitted in different timeslots in each of said time groups.

14. The system of claim 13, wherein said first information includes broadcast control information.

15. The system of claim 13, wherein said first information includes common control information.

16. The system of claim 13, wherein
said first information includes broadcast control information, and
said second information includes common control information.

17. The system of claim 13, wherein said first multiframe structure has 51 frames.

18. The system of claim 13, wherein said first multiframe structure has 52 frames.

19. The system of claim 17, wherein
said second multiframe structure has 52 frames,
said first information includes broadcast control information, and
said second information includes common control information.

20. The system of claim 17, wherein
said means for transmitting a first information and said means for transmitting a second information are components of a base station of a wireless communication network.

21. The system of claim 13, wherein said allocating step prevents said step of transmitting said first information from interfering with said step of transmitting said second information within a same time group, and prevents transmission of any one of said first information and said second information in one time group from interfering with transmission of any one of said first information and said second information in each of the other time groups.

22. The system of claim 13, wherein said first and second multiframe structures are time-grouped according to an edge-compact type network.

23. A communication system, comprising:
means for transmitting a first information on a single frequency carrier in accordance with a first multiframe structure having x frames, x being an integer;
means for transmitting a second information on said same single frequency carrier in accordance with a second multiframe structure having y frames, y being an integer different than x;

means for transmitting a third information on said same single frequency carrier in accordance with a third multiframe structure having z frames, z being an integer different than x and y;

means for arranging said first, second and third multiframe structures in time groups, each of said time groups having a plurality of timeslots; and means for allocating a plurality of timeslots in each of said time groups to said first information, said second information and said third information so that said first, second and third informations are transmitted in time slots that are different from each other within each time group.

24. A method for providing air interface channels in a communications network, comprising:

time multiplexing a plurality of different multiframe structures onto a single frequency carrier to accommodate different channel types defined by said plurality of different multiframe structures on the same single frequency carrier;

arranging said plurality of different multiframe structures in time groups, each of said time groups having a plurality of timeslots; and allocating a plurality of timeslots in each of said time groups to said plurality of different multiframe structures so that said different multiframe structures are transmitted in timeslots that are different from each other within each time group, wherein said time multiplexing includes time multiplexing a first multiframe structure of x consecutive frames, a second multiframe structure of y consecutive frames, and a third multiframe structure of z consecutive frames, x, y and z being different positive integers, with values of x, y and z selected to that a given frame number for the first, second and third multiframe structures simultaneously re-occurs every $x^*y^*z$ frames.

25. The method of claim 24, wherein said different channel types include common control channels, broadcast control channels and traffic channels.

26. The method of claim 24, wherein said first multiframe structure of x consecutive frames is associated with one of common control channels, broadcast control channels and traffic channels.

27. The method of claim 24, wherein said second multiframe structure of y consecutive frames is associated with one of common control channels, broadcast control channels and traffic channels.

28. The method of claim 24, wherein said third multiframe structure of z consecutive frames is associated with one of common control channels, broadcast control channels and traffic channels.

* * * * *